Aug. 13, 1929.  H. BLUM  1,724,251
VALVE
Filed May 10, 1926   3 Sheets-Sheet 1
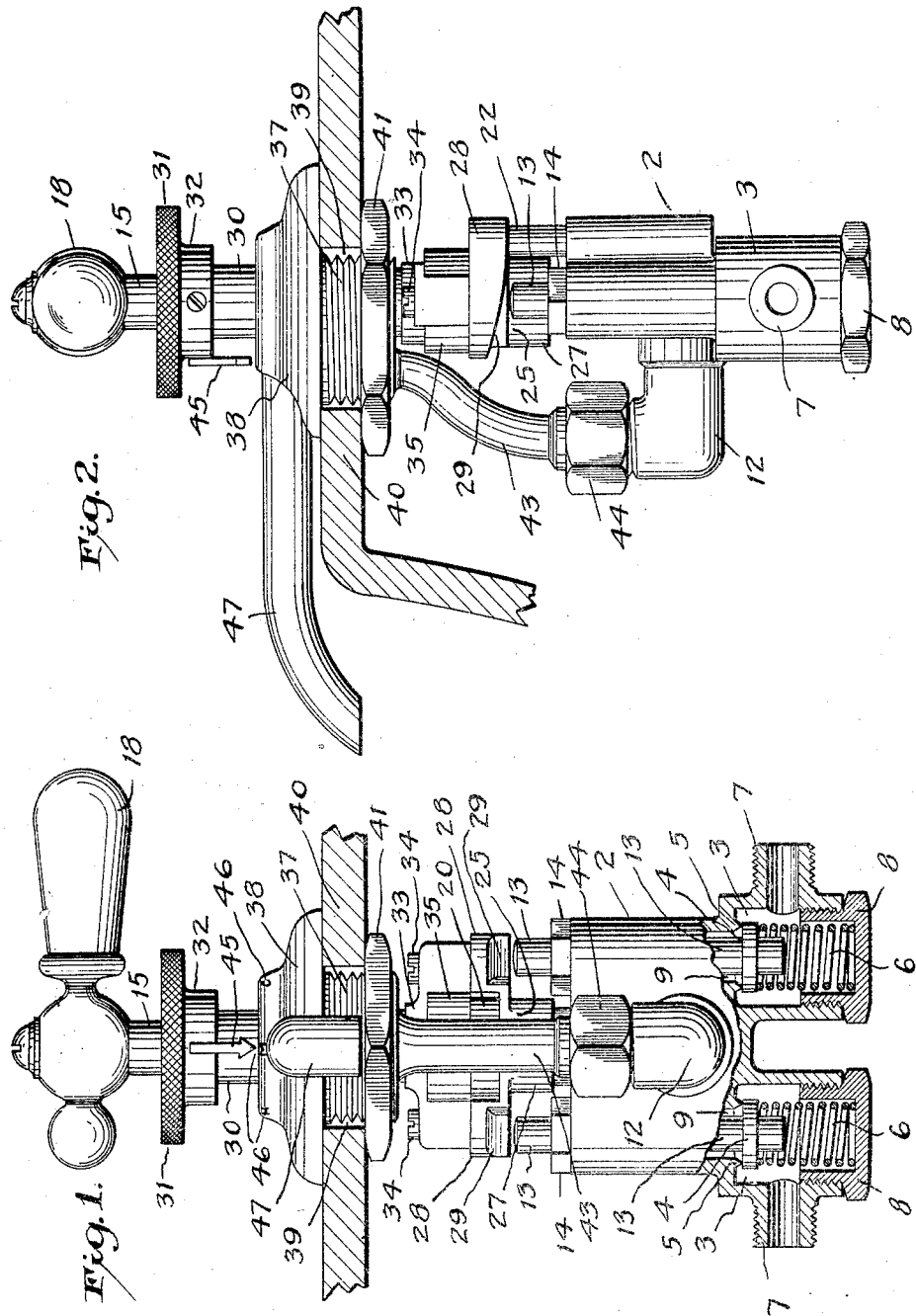
INVENTOR
Henry Blum
BY
ATTORNEY

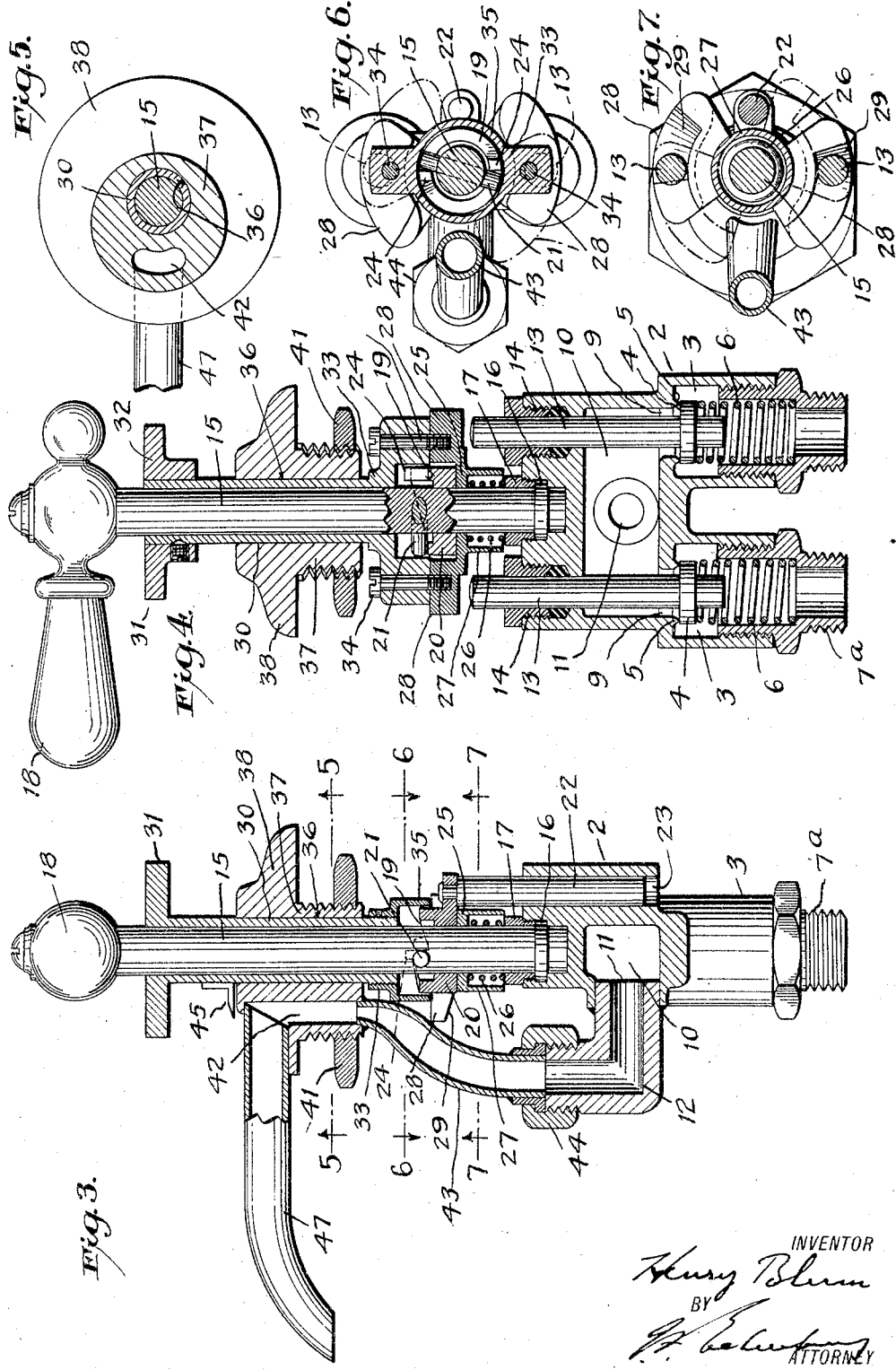

Aug. 13, 1929.  H. BLUM  1,724,251
VALVE
Filed May 10, 1926   3 Sheets-Sheet 3

INVENTOR
Henry Blum
BY
ATTORNEY

Patented Aug. 13, 1929.

1,724,251

UNITED STATES PATENT OFFICE.

HENRY BLUM, OF NEW YORK, N. Y.

VALVE.

Application filed May 10, 1926. Serial No. 108,003.

The invention relates to valves having multiple valve members with means for selectively operating the same. The object is to provide certain improvements in such valves affording advantages in respect to compactness, facile operation, good appearance, manufacturing economy, and ease of installation, and especially to provide a mixing faucet or valve applicable to washstands, sinks, tubs and elsewhere, of a construction advantageous in these and other respects, whereby either hot or cold water, or a mixture in variable proportions, may be obtained.

In the accompanying drawings illustrating certain embodiments of the invention:

Fig. 1 is a front elevation of a preferred embodiment of the invention in place on a stationary wash-basin, a portion of which is seen in section, the lower part of the valve body being broken away and shown in vertical section to reveal parts within;

Fig. 2 is a side view of Fig. 1, showing the basin in vertical section;

Fig. 3 is a central vertical section through the valve structure, with part of the spout in elevation, this view showing certain modifications over Figs. 1 and 2;

Fig. 4 is a central vertical section taken at right angles to Fig. 3, these two views showing two different examples of one feature of construction;

Figure 8:
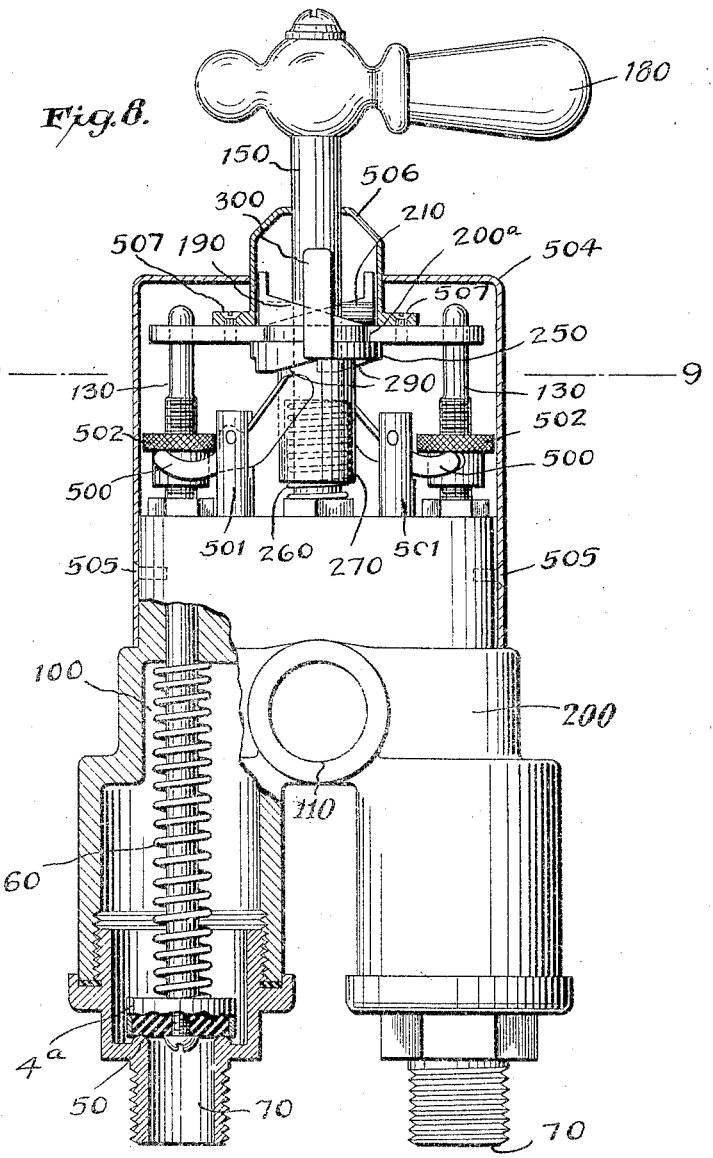
Figure 9:
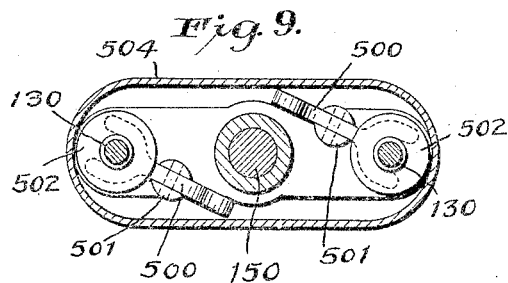

Figs. 5, 6 and 7 are horizontal sections taken on the lines 5—5, 6—6 and 7—7 of Fig. 3, dotted lines in Figs. 6 and 7 being used to show the extreme shifted positions of the selector, which is shown in full lines in an intermediate or mixing position;

Fig. 8 is a view, partly in front elevation and partly in vertical section, of another embodiment;

Fig. 9 is a horizontal section on the line 9—9 of Fig. 8 looking down; and

Figure 10:
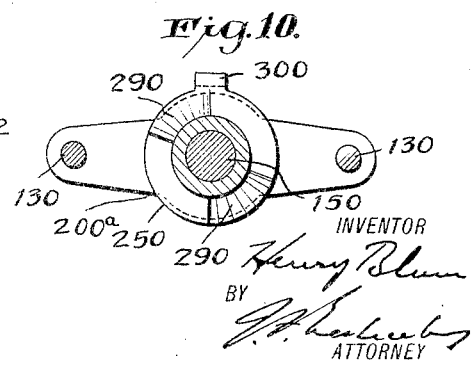

Fig. 10 is a horizontal section on the same line, looking up.

Figs. 1 to 7 will first be described.

The body 2 of the valve has a plurality of parallel valve chambers 3 at its lower end, containing valve members 4, more specifically of a reciprocatory or poppet type, which seat upwardly against seats 5 under the action of springs 6. In Figs. 1 and 2, the valve chambers have lateral inlet nipples 7 projecting in opposite directions, adapted to be connected with, or disconnected from, the supply pipes with little difficulty, the bottoms of the valve chambers being closed by plugs 8, which retain the springs. These plugs can be removed to give access to the valve members and springs, without necessitating disconnection of the valve from the plumbing.

In Figs. 3 and 4, the inlets of $7^a$ are in line with the valve chambers, being formed on inserted pieces which retain the springs. In this case the valves and springs can not be reached without disconnecting the valve from the pipes.

The invention is more particularly a mixing valve or faucet to be connected with cold and hot water pipes, and the valve members are consequently two in number, but certain of the features may be applicable to the selective control of multiple valves of any number, or for other purposes.

The ports 9 at the valve seats open into a common transverse chamber 10, having a common outlet 11 in front, which outlet is shown extended by a member 12, which may be in the form of an elbow.

The stems 13 of the valve members extend upward through the top wall of the valve body, through stuffing-boxes 14, the upper ends of the stems projecting above the body.

A central, turnable operating spindle 15 has a swivel bearing at its lower end in a recess in the top of the body, above the chamber 10. The swivel connection is preferably formed by a collar 16 on the spindle, a short distance above its lower end, resting against a shoulder in the recess, and being confined at the upper side by a screw bushing 17. An operating handle 18 is secured to the spindle.

Means are provided whereby the turning movement of the spindle produces axial thrust, or movement, such means preferably comprising a double cam 19 on a follower 20 slidable on the spindle, together with transverse pin 21 passed through a cross opening in the spindle, with its ends projecting to bear upon the two portions of the cam. The follower is held against turning, as by means of a guide pin 22 secured to its rear portion and extending downward into guided relation with the body, which is shown formed with a guide passage 23 to receive it. Consequently, when the spindle is turned part way around, the pin acting upon the cams depresses the follower. The cams are of self-holding pitch, so that the parts will remain at any degree of valve opening; and the cams have stops 24 to prevent the operating member being turned too far.

A selector member 25 is provided with a circular opening whereby it can turn, or move transversely, and also move longitudinally, or axially, with respect to the spindle, and is preferably thus guided on the spindle beneath the follower 20; or it might be otherwise related to the operating means so as to be operatively interposed between the thrust and the valve members.

A helical spring 26 about the lower portion of the spindle 15, between the selector and the bushing 17 of the body, urges the selector and follower upward, so as to act in opposition to the actuating thrust.

A circular skirt 27 projecting downward from the selector encloses the spring, and, when the parts are depressed, may telescope over the projecting bushing 17.

The selector preferably has two wings 28 pertaining to the two valve members, and those wings, or portions, are so designed that, by appropriately turning the selector, either of the valves can be opened, the other remaining closed, or both can be opened, simultaneously, and in different relative degree to obtain a graduated mixture.

The under surfaces of the two portions of the selector which are opposed to the upper ends of the stems 13 are sloped, as shown at 29, so that, depending upon the position to which the selector is turned, a given downward movement of the selector produced by the turning of the operating spindle will produce more or less opening of one or both of the valves. The relation of the slope is such that, when the selector is turned in one direction, the slope affecting the hot water valve, let us say, is moved to bring higher portions of itself into cooperative relation to that valve member, while the slope affecting the cold water valve is simultaneously moving to bring lower portions of itself into cooperative relation to the cold water valve member. Turning the selector in the reverse direction reverses this condition. In one extreme position of the selector, the cold water valve alone will be actuated when the actuating spindle 15 is turned, the wing of the selector pertaining to the hot-water valve not touching the stem of the hot water valve when the parts are depressed by the actuating means. This is due to the fact that the lowest portion of either of the slopes 29 is too low to reach the upper end of the corresponding valve stem when the selector is pushed down as far as it will go; or, manifestly, the wings might be cut away at the regions of the lowest portions of the slopes, so that in an extreme position one of the wings would not be over a valve stem at all. The cold water alone can, therefore, be turned full on, or at any degree less than full on, depending upon how far the actuating spindle is turned. When the selector is shifted transversely to the other extreme position, the hot water can be turned full on without the cold. In between these extreme positions any relative degree of mixture, from mainly hot to mainly cold, can be obtained by properly positioning the selector and then operating the handle 18.

While it is preferable to provide two slopes 29, one for each valve member, a slope might be provided in connection with only one of the valve members, though with less advantage.

In the embodiments of Figs. 1 to 7, the selector is shifted by means of a sleeve 30 encircling the upper part of the spindle 15 and affording a bearing therefor, this sleeve having a knurled flange 31, or other suitable handle, on its upper end below the handle 18. In Figs. 1, 2 and 4 this flange or wheel is shown as formed of a separate piece 32, which is detachably secured to the upper end of the sleeve 30. In Fig. 3 the handle flange 31 is shown integral with the sleeve, which for the purpose of assembling and dis-assembling, is screwed, or otherwise detachably connected, at its lower end to an enlargement 33. In Figs. 1, 2 and 4 this enlargement is integral with the sleeve.

The said enlargement constitutes a means of connection with the selector 25, to which it is shown united by screws 34. The connection between the sleeve 30 located above the follower 20 and the cam and pin means 19, 21 and the selector beneath these parts is recessed so as to accommodate such parts and permit their operation.

A circular chamber or wall 35, formed in the enlargement 30 provides a retainer opposed to the ends of the pin 21, keeping this pin from working out of the transverse hole in the spindle 15.

The spindle 15 passes through and has bearing in a cylindrical opening 36 which is formed eccentrically through the body of a thimble 37. This thimble has a top flange or plate 38, which is preferably concentric with the opening 36 and, therefore, with the shaft parts which project above the plate. The body of the thimble is externally screw-threaded.

This thimble is inserted downward through an opening 39 in the top, rear portion 40 of a wash-basin, or through an opening in any appropriate support, and receives a clamping nut 41, the wall 40 being clamped between this nut and the plate 38.

The body of the thimble 37 is also formed with a water passage 42 arranged in the thicker part of the wall of the body resulting from the offsetting of the operating opening 36 with respect to the center of such body. Said water passage is advantageously made of a somewhat crescentic cross-section, that is to say oblong, with its outer side convexly and its inner side concavely curved, so as to obtain the desired flow in the space available, without weakening the thimble. The diameter of this body, it will be understood, will usually be limited by the size of the hole in the basin or other fixture; and, in general, the design enables both the operating parts and the liquid to be carried through a thimble or bushing of moderate proportions.

The water passage 42 is connected with the member 12 at the outlet of the valve body 2 by a conduit section 43 and a coupling 44, the latter separably connecting the lower end of said section to the member 12, while the upper end of said section is shaped to conform to the cross-section of the passage 42 and is soldered or otherwise united to the thimble. 47 is a spout connected to the passage 42.

The operating means for the selector is provided with an indicator enabling the user to set the selector with certainty. Such indicator may advantageously consist of a pointer or index 45, on the upper portion of the sleeve 30, and cooperating marks or designations 46, signifying hot, cold and mixed, placed on the plate 38.

The operation will readily be understood. To get hot water only, the user turns the selector operating hand-wheel 31 to the extreme position marked for hot. The selector is then positioned so that the portion over the stem 13 of the hot water valve member will be depressed to the extent corresponding to full opening, when the actuating handle 18 of the spindle 15 is turned as far as it will go in the "on" direction. The portion of the slope of the selector over the stem of the cold water valve member, however, is too low to touch that stem when the parts are depressed, consequently the cold water valve member will not be opened; or, as previously indicated, the selector may be so formed that this portion of the selector is carried entirely beyond the projection of the stem of the cold water valve member. To get cold water only, the selector is turned to the other extreme position, and the condition described is reversed. In either case, when the spindle 15 is turned full on, the valve member which is selected is fully opened, while the other valve remains closed. To get a smaller flow of either hot or cold water, the actuating spindle is simply not turned so far.

To get a mixture, the selector is placed either in the mid-position, where an equal mixture of cold and hot water will be obtained, or at any point in the mixing range at either the hot or the cold side of mid-position, whereby an adjusted mixture, tending toward hot or tending toward cold, is obtainable. With such an adjustment, when the operating spindle is turned in the valve opening direction, both of the valves are opened, either in the same degree or in differing degrees, depending upon adjustment.

The embodiment of the invention shown in Figs. 8 to 10 illustrates the fact that a selector operatively interposed between the actuating means and the valve members need not act directly upon the valve members or their stems. In this instance the selector 250, which may be circular rather than of two-lobed form, acts upon the inner ends of a pair of levers 500, which are fulcrumed intermediate their ends on brackets 501 on the top of the valve body 200. The other ends of these levers are bifurcated to embrace collars 502 on the valve stems 130, said collars having flanges against which the outer ends of the levers bear in an upward direction when their inner ends are depressed.

The valve members 4$^a$ seat downwardly against seats 50, adjacent the inlets 70, under the pressure of springs 60 acting between the valve members and the top of the common chamber 100, from which there is an outlet at 110. The valves are consequently lifted for opening.

The selector 250 has sloped under surfaces 290 to cooperate with the levers in a manner similar to that in which the under surfaces of the selector 25 of the other forms cooperate with the valve stems directly. That is to say, the selector is so designed that it can be either set so that, when the operating handle is turned, either of the valves can be opened, or set so that both can be opened simultaneously in different relative degrees.

The follower 200$^a$ carries a double cam 190 acted upon by a pin 210 as in the other forms, and this follower may be guided on the extensions of the valve stems, said extensions projecting through holes in the ends of the follower.

A cover 504 is shown applied over the mechanism and secured to the upper part of the valve body by one or more screws 505, while another small cap 506 fits in an opening in the top of this cover and is secured at 507 to the follower so as to enclose the cam 190 and the pin 210, forming the circular retainer which prevents the pin becoming displaced.

The means for shifting the selector may consist of an arm 300 projecting upward from the selector through a slot provided between the cap 506 and the edge of the opening in the top of the cover 504.

The operating spindle 150 is swiveled in the top of the valve body, passes through the selector, the follower and the cap 506, and bears the operating handle 180 on its upper end. The spring opposing the thrust on the selector and follower when the valve is opened is marked 260, and the skirt 270 is shown depending from the selector to house this spring.

Numerous other embodiments of the invention may be devised by the mechanic skilled in the art; and it will be understood that there may be various changes in form, details, arrangement, and proportions, and by way of addition, omission, substitution and reversal; that terms of orientation are relative since the valve may be installed in different positions, and that there may be more or less rearrangement for different types of installation or modes of applying the invention. The invention is especially advantageous as a mixing valve apparatus, but it will not be confined to use with hot and cold water in connection with plumbing in buildings, but may be used with other liquids, and some of the features claimed are not necessarily limited to multiple valve apparatus whereby two or more flows are mixed.

What I claim as new is:

1. A valve structure comprising a body having a plurality of inlets, a common chamber and an outlet from said chamber, a plurality of valve members seating respectively between said inlets and said common chamber, a turnable operating member with means whereby turning produces thrust in the direction of the axis, and a transversely movable selector arranged to be acted upon by said means and shiftable to effect different desired operations of said valves.

2. A valve structure comprising a body having a plurality of inlets, a common chamber and an outlet from said chamber, a plurality of valve members seating respectively between said inlets and said common chamber, and having stems passing through the top of the body, a turnable operating spindle swiveled at its lower end in the top of said body above said common chamber, means whereby the turning of said spindle produces downward thrust and a transversely movable selector interposed between said means and the valve stems.

3. In a valve, the combination of a pair of valve members, a turnable operating member with means whereby turning produces thrust in the axial direction, and a transversely shiftable selector interposed between said means and the valve members and adapted to actuate either or both thereof, said selector being sloped so as to be capable of opening said valve members simultaneously in different relative degree.

4. A valve structure comprising a body having a pair of inlets and a common outlet, a pair of valve members seating between said inlets and said outlet, a turnable operating member with means whereby turning produces thrust in the direction of the axis, and a transversely movable selector interposed between said means and the valve members and adapted to actuate either or both thereof, and so formed as to be capable of opening said valve members simultaneously in different relative degree.

5. A faucet comprising a body having a pair of inlets, a common outlet, and a spout connected with said outlet, a pair of valve members seating between said inlets and said outlet, a turnable operating member with means whereby turning produces thrust in the direction of the axis, and a transversely movable selector interposed between said means and the valve members and adapted to actuate either or both thereof, and so formed as to be capable of opening said valve members simultaneously in different relative degree.

6. In a valve structure, the combination with a plurality of valve members, of a turnable operating spindle, a follower and means whereby turning of said spindle thrusts the follower, a turnable selector interposed between the follower and the valve members, and a turnable selector sleeve about said spindle above the thrust and follower means, and operatively connected with the selector.

7. In a valve structure, the combination with a plurality of valve members, of a turnable operating spindle, a follower and means whereby turning of said spindle thrusts the follower, a turnable selector interposed between the follower and the valve members, and a turnable selector sleeve about said spindle above the thrust and the follower means, and having an enlargement at its lower end united to said selector.

8. In a valve structure, the combination with a plurality of valve members, of a turnable operating spindle, a follower thereon, and cam and pin means whereby turning of the spindle thrusts the follower, a turnable selector interposed between said follower and the valve members, a turnable selector sleeve about said spindle above said cam and pin means and connected with said selector, and a retaining enclosure for said pin formed in the connection between said sleeve and the selector.

9. In a valve structure, the combination with a plurality of valve members, of a turnable operating spindle, a follower thereon, and cam and pin means whereby turning of the spindle thrusts the follower, a turnable selector interposed between said follower and valve members, and a retaining enclosure for said pin.

10. In a faucet, a thimble having a cylindrical opening and a water passage arranged therein, a sleeve and a spindle in said cylindrical opening, a spout connected with said water passage, two valve members controlling communication between said water passage and two supplies, selector means controlled by said sleeve, and valve-opening means controlled by said spindle.

11. In a faucet, a thimble having an operating opening and a water passage arranged therein, said opening and passage being separate, two valve members controlling communication between said water passage and two supplies, and operating and selecting means passing through said operating opening.

12. In a valve structure, a body, a plurality of valve devices, an operating spindle swiveled in the body, a follower, a selector interposed between said follower and the valve members, cam means whereby turning of the spindle thrusts the follower, and a spring acting upon the follower and selector and a downwardly projecting skirt enclosing said spring.

13. In a valve structure, a body, a plurality of valve devices, an operating spindle, a follower, means whereby turning of the spindle thrusts the follower, a selector interposed between the follower and the valve devices, and a guide pin carried by the follower and cooperating with the body.

14. In a faucet, the combination of a body having two inlets and a common outlet, two valve members acting between said inlets and the common outlet, a thimble having an operating opening and a liquid passage arranged therein, said opening and passage being separate, a spout connected with said liquid passage, a connection between said outlet and said liquid passage, and operating and selecting means passing through said operating opening to cooperate with said valve members.

15. In a faucet, the combination of a body having two inlets and a common outlet, two valve members acting between said inlets and the common outlet, a thimble having an operating opening and a liquid passage arranged therein, a spout connected with said liquid passage, a connection between said outlet and said liquid passage, and means for selecting and means for operating said valve members having a sleeve and a spindle passing through said operating opening.

16. In a faucet, the combination of a valve body having two inlets and a common outlet, two valve members acting between said inlets and common outlet, a thimble having an operating opening and a liquid passage arranged therein, said opening and passage being separate, a connection from said outlet to said passage, and turnable operating means extending through said operating opening to operate said valve members.

17. In a faucet, the combination of a valve body having two inlets and a common outlet, two parallel plunger valves in said body acting between said inlets and common outlet, a thimble having an operating opening and a liquid passage arranged therein, said opening and passage being separate, a spout connected with said liquid passage, a connection from said outlet to said passage, a turnable operating shaft parallel with said plunger valves, said shaft extending through said opening and having a handle at the upper end, and means whereby turning of said shaft produces thrust to open either of the valves.

18. In a faucet, the combination of a valve body having two inlets and a common lateral outlet, two valve members acting between said inlets and common outlet, a thimble having an operating opening and a liquid passage therein, said opening and passage being separate, valve operating means extending through said operating opening, a conduit section connected with said passage at the under side of said thimble, and a detachable connection between said outlet and said conduit section.

HENRY BLUM.